United States Patent
Rodriguez et al.

(10) Patent No.: US 10,889,506 B2
(45) Date of Patent: Jan. 12, 2021

(54) VANADIUM OXIDE FOR INFRARED COATINGS AND METHODS THEREOF

(71) Applicant: National Technology & Engineering Solutions of Sandia, LLC, Albuquerque, NM (US)

(72) Inventors: Mark A. Rodriguez, Albuquerque, NM (US); Nelson S. Bell, Albuquerque, NM (US); Paul G. Clem, Albuquerque, NM (US); Cynthia Edney, Sandia Park, NM (US); James Griego, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 87 days.

(21) Appl. No.: 16/183,426

(22) Filed: Nov. 7, 2018

(65) Prior Publication Data
US 2019/0071319 A1 Mar. 7, 2019

Related U.S. Application Data

(62) Division of application No. 14/723,334, filed on May 27, 2015, now Pat. No. 10,160,660.

(60) Provisional application No. 62/004,052, filed on May 28, 2014.

(51) Int. Cl.
| | |
|---|---|
| C01G 31/00 | (2006.01) |
| C01G 31/02 | (2006.01) |
| B01J 6/00 | (2006.01) |
| B01J 19/00 | (2006.01) |

(52) U.S. Cl.
CPC ............ *C01G 31/02* (2013.01); *B01J 6/00* (2013.01); *B01J 19/0006* (2013.01); *B01J 2219/00164* (2013.01); *C01P 2002/52* (2013.01); *C01P 2002/72* (2013.01); *C01P 2002/76* (2013.01)

(58) Field of Classification Search
CPC .................................................. C01G 31/02
USPC .................................................. 423/594.17
See application file for complete search history.

(56) References Cited

U.S. PATENT DOCUMENTS

| | | | |
|---|---|---|---|
| 4,965,150 A * | 10/1990 | Dahn | H01M 4/485 |
| | | | 423/594.17 |
| 5,427,763 A * | 6/1995 | Lawton | C01G 31/02 |
| | | | 423/593.1 |
| 5,949,071 A | 9/1999 | Ruffner et al. | |
| 6,153,317 A | 11/2000 | Boyle et al. | |
| 6,231,666 B1 | 5/2001 | Clem et al. | |
| 6,518,168 B1 | 2/2003 | Clem et al. | |
| 6,746,496 B1 | 6/2004 | Kravitz et al. | |
| 7,306,780 B1 | 12/2007 | Kravitz et al. | |
| 8,292,492 B2 | 10/2012 | Ho et al. | |
| 8,298,905 B2 | 10/2012 | Ito | |
| 8,334,421 B1 | 12/2012 | Gao et al. | |
| 8,425,749 B1 | 4/2013 | Ravula et al. | |
| 8,647,167 B2 | 2/2014 | Heilbron et al. | |
| 8,736,108 B1 | 5/2014 | Nielson et al. | |
| 8,772,566 B2 | 7/2014 | Gao et al. | |
| 8,877,388 B1 | 11/2014 | Ihlefeld et al. | |
| 8,902,115 B1 | 12/2014 | Loui et al. | |
| 2010/0015340 A1 | 1/2010 | Clem et al. | |
| 2010/0118642 A1 | 5/2010 | Ho et al. | |
| 2010/0233874 A1 | 9/2010 | Ito | |
| 2012/0040100 A1 | 2/2012 | Matias et al. | |
| 2013/0075677 A1 | 3/2013 | Gao et al. | |
| 2013/0344335 A1 | 12/2013 | Gao et al. | |
| 2014/0154493 A1 | 6/2014 | Lozano et al. | |
| 2015/0030909 A1 | 1/2015 | Ihlefeld et al. | |
| 2015/0118565 A1 | 4/2015 | Bell et al. | |

OTHER PUBLICATIONS

Arcangeletti E et al., "Evidence of a pressure-induced metallization process in monoclinic $VO_2$," *Phys. Rev. Lett.* 2007;98:Art. 196406 (4 pages).
Bellido-Gonzalez V et al., "Reactive gas control of non-stable plasma conditions," *Thin Solid Films* 2006;502:34-9.
Briggs RM et al., "Compact silicon photonic waveguide modulator based on the vanadium dioxide metal-insulator phase transition," *Optics Express* May 2010;18(11):11192-201.
Enjalbert R et al., "A refinement of the structure of $V_2O_5$," *Acta Cryst.* 1986;C42:1467-9.
Jones AC et al., "Nano-optical investigations of the metal-insulator phase behavior of individual $VO_2$ microcrystals," *Nano Lett.* 2010;10:1574-81.
Kucharczyk D et al., "Accurate X-ray determination of the lattice parameters and the thermal expansion coefficients of $VO_2$ near the transition temperature," *J. Appl. Cryst.* 1979;12: 370-3.
Lazarovits B et al., "Effects of strain on the electronic structure of $VO_2$," *Phys. Rev. B* 2010;81: Art. 115117 (9 pages).
Longo JM et al., "A refinement of the structure of $VO_2$," *Acta Chem. Scand.* 1970;24:420-6.
Lu Z et al., "Synthesis and thermochromic properties of vanadium dioxide colloidal particles," *J. Mater. Chem.* 2011;21:14776-82.
Manning TD et al., "Intelligent window coatings: Atmospheric pressure chemical vapor deposition of tungsten-doped vanadium dioxide," *Chem. Mater.* 2004;16:744-9.

(Continued)

*Primary Examiner* — Steven J Bos

(74) *Attorney, Agent, or Firm* — Helen S. Baca; Kevin W. Bieg

(57) ABSTRACT

The present invention relates to vanadium oxide and methods of controlling reaction processes for making such materials (e.g., powders). In particular embodiments, the method includes control of oxygen partial pressure in order to kinetically control the oxidation species of the crystalline vanadium oxide material. Other methods, uses, systems, protocols, and coatings are also described.

10 Claims, 5 Drawing Sheets

(56) References Cited

OTHER PUBLICATIONS

Oka Y et al., "Phase transition and $V^{4+}$-$V^{4+}$ pairing in $VO_2(B)$," *J. Solid State Chem.* 1993;105:271-8.

Rodriguez MA et al., "In-situ monitoring of vanadium oxide formation using high temperature XRD," abstract for the *62nd Annual Conference on Applications of X-ray Analysis: The Denver X-ray Conference*, held on Aug. 5-9, 2013 at Westminster, Colorado, U.S.A (1 page).

Rodriguez MA et al., "In-situ monitoring of vanadium oxide formation using high temperature XRD," presentation for the *62nd Annual Conference on Applications of X-ray Analysis: The Denver X-ray Conference*, presented on Aug. 8, 2013 at Westminster, Colorado, U.S.A (17 pages).

Rodriguez MA et al., "In-situ monitoring of vanadium dioxide formation using high-temperature XRD," *Powder Diffr.* Jun. 2014;29(2):97-101.

Rogers KD, "An X-ray diffraction study of semiconductor and metallic vanadium dioxide," *Powder Diffr.* Dec. 1993;8(4):240-4.

Ruzmetov D et al., "Correlation between metal-insulator transition characteristics and electronic structure changes in vanadium oxide thin films," *Phys. Rev. B* 2008;77:Art. 195442 (5 pages).

Vincent MG et al., "Electron-density studies of metal-metal bonds. II. The deformation density of $V_2O_3$ at 295 K," *Acta Cryst.* 1980;A36:808-13.

Waltersson K et al., "The crystal structure of $V_3O_7$," *Acta Cryst.* 1974;B30:2644-52.

Wang S et al., "Porous monodisperse $V_2O_5$ microspheres as cathode materials for lithium-ion batteries," *J. Mater. Chem.* 2011;21:6365-9.

Wilhelmi KA et al., "A refinement of the crystal structure of $V_6O_{13}$," *Acta Chem. Scand.* 1971;25:2675-87.

Yamamoto S et al., "Preparation of monodisperse and spherical rutile $VO_2$ fine particles," *Chem. Mater.* 2009;21:198-200.

Yamamoto S et al., "Synthesis of submicron-sized, monodisperse spherical $V_2O_5$ particles," *Mater. Res. Soc. Symp. Proc.* 2005;879E:Z7. 14.1-14.6.

Yang Z et al., "Oxide electronics utilizing ultrafast metal-insulator transitions," *Annu. Rev. Mater. Res.* 2011;41:337-67.

Zhang Z et al., "Thermochromic $VO_2$ thin films: Solution-based processing, improved optical properties, and lowered phase transformation temperature," *Langmuir* 2010;26(13):10738-44.

Derwent Acc. No. 2009-N30278, English abstract for Korean Patent Application No. KR 2009-090839A, patent application publication date of Aug. 26, 2009, inventors Kim KH et al., "Vanadium dioxide layer production method involves reacting plasma oxygen during absorption of vanadium on surface of silicon substrate, and absorbed vanadium forms vanadium dioxide layer," Derwent database accessed on Oct. 12, 2017 (2 pages).

\* cited by examiner

VANADIUM OXIDE FOR INFRARED COATINGS AND METHODS THEREOF

CROSS-REFERENCE TO RELATED APPLICATION

This application is a divisional of prior application Ser. No. 14/723,334, filed May 27, 2015, which claims the benefit of U.S. Provisional Application No. 62/004,052, filed May 28, 2014. Both applications are hereby incorporated by reference in their entirety.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to vanadium oxide powders and methods of controlling reaction processes for making such materials (e.g., vanadium oxide powders). Other methods, uses, systems, protocols, and coatings are also described herein.

BACKGROUND OF THE INVENTION

Vanadium oxide $V_xO_y$ exists in many forms and phases (e.g., x is from 1 to 5, y is from 1 to 13). For instance, vanadium (V) has five common valence states, and oxygen (O) content can vary based on this valence state. In addition, different forms or phases can exist at the same reaction conditions, where metastable and/or insulative forms can co-exist with a desired tetragonal, crystalline form. Thus, control of these reactions conditions is critical to obtain the desired vanadium oxide form with the desired stoichiometry.

In particular, the crystalline form of $VO_2$ has interesting transition characteristics. This form is a metal-insulator-transition (MIT) material, meaning that crystalline $VO_2$ undergoes a temperature-dependent crystal structural change, which in turn results in an electronic structure change.

This transition provides two key changes in material characteristics. First, the resistivity of the material depends on the ambient temperature T. For $VO_2$, the material is an insulator at T below the transition temperature $T_c$ ($T<T_c$) but a metallic conductor at $T>T_c$. Second, some optical properties (e.g., absorption and refractive indices) of the material also depend on T. For instance, the $VO_2$ material absorbs infrared (IR) radiation for $T<T_c$ but reflects IR for $T>T_c$.

These temperature-dependent characteristics can be useful for any number of applications, including temperature-dependent switches, electronics, oscillators, memristors, films, coatings, and sensors. For these applications, large quantities of high purity and quality vanadium oxide are desired. As yet, synthesizing these materials in such a manner is challenging and generally requires complicated reaction protocols. Accordingly, simplified methods and protocols to control vanadium oxide formation are needed.

SUMMARY OF THE INVENTION

The present invention relates to methods, protocols, systems, and materials including crystalline vanadium oxide in any useful form (e.g., a powder, a particle, a coating, a film, etc.). In addition, the crystalline vanadium oxide can be employed in any useful application, (e.g., for use as infrared polymer coatings). In particular, the kinetics of phase formation can be controlled by controlling the $O_2$ partial pressure ($pO_2$). For instance, if high oxygen content phases (e.g., $V_6O_{13}$) exist, then the $pO_2$ can be lowered to kinetically suppress the reaction rate through the absence of sufficient oxygen. This strategy applies even for lower temperature conditions (e.g., $T<700°$ C.).

Accordingly, in a first aspect, the invention features a method of preparing crystalline vanadium oxide, the method including: (i) providing a vanadium oxide precursor; and (ii) annealing the precursor at a reduced $O_2$ partial pressure, thereby preparing the crystalline vanadium oxide in tetragonal form.

In some embodiments, the reduced $O_2$ partial pressure is of from about 2 ppm to about 500 ppm (e.g., or any range described herein).

In some embodiments, step (ii) is performed at a reduced temperature (e.g., from about 300° C. to about 450° C., as well as any temperature ranges described herein) and/or for about 5 minutes or more (e.g., from about 5 minutes to about 72 hours, as well as any ranges described herein).

In yet other embodiments, step (ii) is performed by using a rapid annealing rate from an initial temperature to the reduced temperature, where the annealing rate is of from about 1° C. per minute to about 200° C. per minute or any other rate(s) described herein.

In further embodiments, the method includes (iii) obtaining one or more spectroscopy measurements of one or more vanadium oxide form(s) prepared in step (ii); and (iv) optionally adjusting to a further reduced $O_2$ partial pressure (e.g., any useful $pO_2$, such as those described herein), thereby further isolating the crystalline vanadium oxide in tetragonal form.

In some embodiments, the method includes (iii) determining a first temperature $T_1$ at which a metastable $VO_2$ form and/or a tetragonal $VO_2$ form is present. In further embodiments, the methods includes (iv) adjusting to a further reduced $O_2$ partial pressure, thereby further isolating the crystalline vanadium oxide in tetragonal form.

In another aspect, the invention features a method of preparing crystalline vanadium oxide, the method including: (i) providing a vanadium oxide precursor; (ii) annealing the precursor at a first $O_2$ partial pressure $P_1$, thereby forming one or more vanadium oxide form(s); (iii) obtaining one or more spectroscopy measurements of the vanadium oxide form(s); (iv) determining a first temperature $T_1$ at which a metastable $VO_2$ form and/or a tetragonal $VO_2$ form is present; and (v) adjusting to a second $O_2$ partial pressure $P_2$ while maintaining $T_1$, thereby preparing the crystalline vanadium oxide.

In some embodiments, the method further includes (vi) adjusting to a second temperature $T_2$ while maintaining $P_2$, where step (v) and (vi) can be performed in any order.

In some embodiments, $P_2$ is less than $P_1$. In other embodiments, $T_2$ is greater than $T_1$.

In yet another aspect, the invention features a system for preparing crystalline vanadium oxide. In some embodiments, the system includes (i) a chamber configured to accommodate a vanadium oxide precursor; (ii) an oxygen monitor configured to detect one or more $O_2$ partial pressure values within the chamber and to transmit the $O_2$ partial pressure value(s); (iii) an oxygen source for supplying $O_2$ within the chamber; (iv) a feedback controller configured to receive one or more inputs and to transmit one or more outputs, where the one or more inputs include the one or more $O_2$ partial pressure values and the one or more outputs include an $O_2$ flow control signal; and (v) an actuator for controlling flow of the oxygen source, where the actuator is configured to receive the one or more outputs from the feedback controller.

In some embodiments, the actuator is configured to transmit one or more signals to a valve that controls $O_2$ flow for the oxygen source.

In further embodiments, the system includes a heated stage. In yet other embodiments, the chamber is a heating chamber disposed substantially around the heated stage.

In some embodiments, the system further includes a diffractometer configured to obtain one or more diffraction measurements within the chamber.

In any embodiment herein, the crystalline vanadium oxide is $VO_2$.

In any embodiment herein, the vanadium oxide precursor includes vanadium oxide (e.g., vanadium pentoxide $V_2O_5$) particles (e.g., nanoparticles and/or microparticles, including spherical forms thereof).

In any embodiment herein, the crystalline vanadium oxide has substantially the same morphology as the vanadium oxide precursor (e.g., the vanadium oxide particles).

In any embodiment herein, the crystalline vanadium oxide is in tetragonal form.

Definitions

As used herein, the term "about" means+/−10% of any recited value. As used herein, this term modifies any recited value, range of values, or endpoints of one or more ranges.

As used herein, the term "crystalline" means a compound or material having three-dimensional order on the level of atomic dimensions. In some embodiments, the structural units are arranged in fixed geometric patterns or lattices (e.g., monoclinic, tetragonal, cubic, hexagonal, orthogonal, triclinic, or trigonal lattices), so that crystalline solids have rigid long range order. The structural units that constitute the crystal structure can be atoms, molecules, or ions. Crystalline solids show definite melting point(s) and/or definite x-ray diffraction (XRD) peak(s). In some embodiments, crystalline vanadium oxide includes a 2θ peak at about 27.6°, 27.8°, 37.0°, and/or 37.2°.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

BRIEF DESCRIPTION OF THE DRAWINGS

FIG. 4A provides a plot for conditions of up to 600° C. under a flowing mixture of $N_2/O_2$ gas ($pO_2$~500 ppm), whereas FIG. 4B provides a plot for conditions of up to 700° C. employing a gettered helium gas ($pO_2$<1 ppm). Darker regions generally indicate lower counts, except that darker regions labeled "Intermediate" and "Precursor" indicate higher counts of those labeled materials.

DETAILED DESCRIPTION OF THE INVENTION

The present invention relates to methods, calibration protocols, systems, and materials including vanadium oxide. In particular, the methods and protocols provide vanadium oxide predominantly as a single phase in crystalline form. Furthermore, these methods and protocols encompass a simple, single annealing step (or heat treatment step) to obtain the desired material. For instance, the calibration protocol relies on control of $O_2$ partial pressure ($pO_2$) to obtain the desired vanadium oxide form with the appropriate oxygen content or stoichiometry. Such calibration protocols are useful for identifying appropriate reaction conditions (e.g., reduced $pO_2$ or reaction temperature T) to form the desired vanadium oxide form, as well as determining simplified methods employing those optimal conditions. Additional details follow.

Vanadium Oxide Precursor

The present invention relates to the treatment of any useful vanadium oxide precursor in any useful form (e.g., powder, crystal, particle, film, etc.). The precursor can include any useful material, such as $V_2O_5$ (e.g., particles, such as $V_2O_5 \cdot aPy \cdot bH_2O$, where a is about 0.8 and b is about 0.9, including colloidal particles; and crystalline $V_2O_5$), $V_2O_3$, vanadium metal V, $V_mO_{2m-1}$ (e.g., where m is 1, 2, 3, 4, or 5), $VO_2$ (e.g., a metastable or amorphous form of $VO_2$), vanadium (IV) materials (e.g., vanadyl acetylacetonate $VO(acac)_2$), vanadium (V) materials (e.g., vanadium (V) oxytriisopropoxide, vanadium (V) oxytripropoxide, or vanadium (V) oxytriethoxide), and mixtures thereof.

These precursors can be in any useful form. Exemplary forms include powder, crystal (e.g., bulk crystal, microcrystal, as well as comminuted or crushed forms thereof), particle (e.g., nanoparticles and/or microparticles), colloidal, amorphous, and/or crystalline forms. When provided in particle form, the precursor can have any useful powder size (e.g., an average diameter of from about 5 nm to about 800 nm) or shape (e.g., spheres). Optionally, one or more dopants can be present in the precursor to change $T_c$, improve visible transmittance, decrease hysteresis upon cooling and heating, improve switching efficiency, etc. For instance, one or more donor dopants can be present to lower $T_c$ (e.g., $T_c$<68° C.), where exemplary dopants include tungsten (W, e.g. $W^{6+}$), hydrogen (H), titanium (Ti), zirconium (Zr), niobium (Nb), tantalum (Ta), molybdenum (Mo), rhenium (Re), ruthenium (Ru), osmium (Os), iridium (Ir), and/or fluorine (F). In another instance, one or more acceptor dopants can be present to increase $T_c$ (e.g., $T_c$>68° C.), where exemplary dopants include chromium (Cr), magnesium (Mg), titanium (Ti), iron (Fe), cobalt (Co), aluminum (Al), gallium (Ga), indium (In), thallium (Th), germanium (Ge), tin (Sn), and/or bismuth (Bi).

Figure 8A:
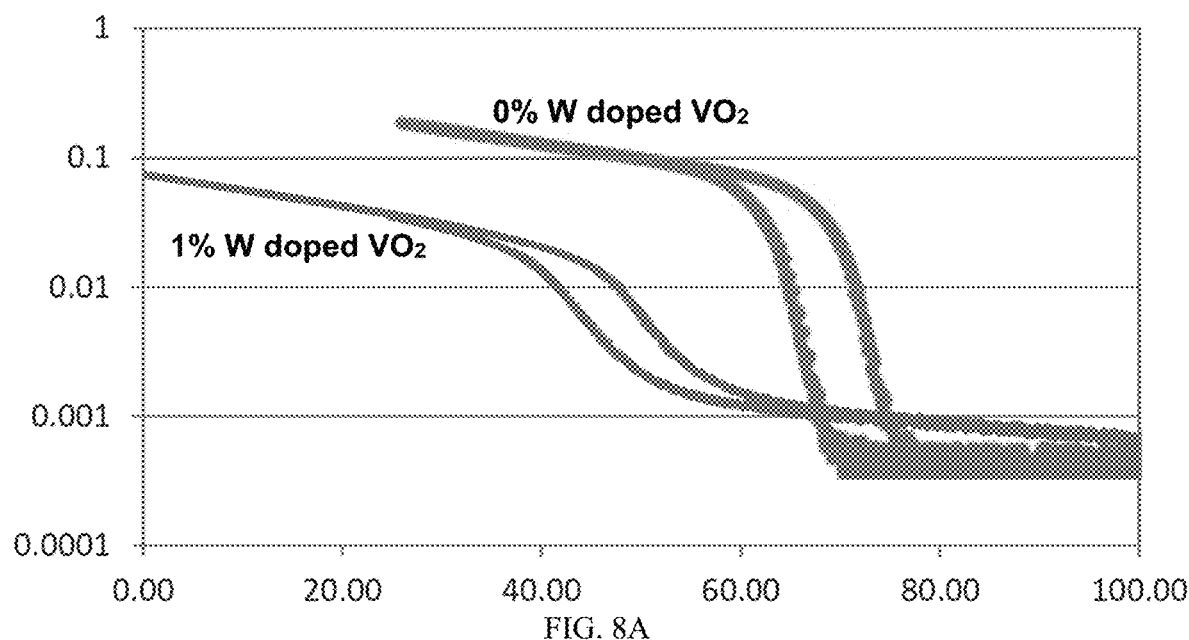
FIG. 8A-8B provides the MIT transition temperature $T_c$ for $VO_2$ films. Provided are (A) hysteresis analysis for $T_c$ using 0% and 1 atomic % tungsten doped $VO_2$ and (B) a graph showing $T_c$ as a function of tungsten doping (atomic % W). As can be seen, film characteristics can be tuned by employing doping. When using tungsten as the dopant, $T_c$ could be tuned from 67° C. to −8° C. by increasing atomic % of W.
Figure 8B:
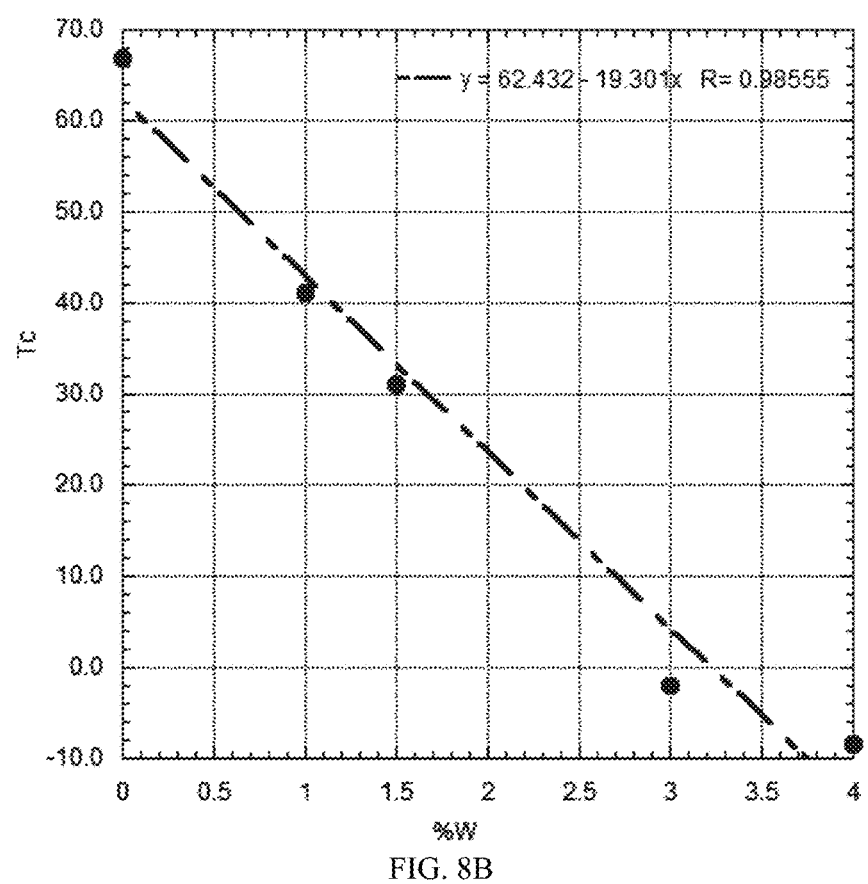

FIGS. 8A and 8B describes the effect of one dopant on $T_c$. As can be seen, film characteristics can be tuned by employing dopants at different amounts. When using tungsten (W) as the dopant, $T_c$ was tuned from 67° C. to −8° C. by increasing atomic % of W. In a similar manner, studies using different dopant(s) can be conducted in order to observe dopant effects on $T_c$, as well as other optical properties (e.g., transmittance), hysteresis, and/or switching efficiency.

Exemplary methods for forming precursors include metal hydroxide hydrothermal synthesis, metal alkoxide hydrolysis, metal ablation, chemical vapor deposition, vapor phase transport, chemical transport techniques, pulsed laser deposition, sputtering, focused ion beam lithography, ion beam evaporation, and/or electron beam evaporation, which can include further steps of annealing, reducing, oxidizing, heating, drying, or sintering. Other methods include any described in Yamamoto S et al., "Synthesis of submicron-sized, monodisperse spherical $V_2O_5$ particles," *Mater. Res. Soc. Symp. Proc.* 2005; 879E:Z7.14.1-14.6; Jones A C et al., "Nano-optical investigations of the metal-insulator phase behavior of individual $VO_2$ microcrystals," *Nano Lett.* 2010; 10:1574-81; Lu Z et al., "Synthesis and thermochromic properties of vanadium dioxide colloidal particles," *J. Mater. Chem.* 2011; 21:14776-82; Manning T D et al., "Intelligent window coatings: Atmospheric pressure chemical vapor deposition of tungsten-doped vanadium dioxide," *Chem. Mater.* 2004; 16:744-9; Ruzmetov D et al., "Correlation between metal-insulator transition characteristics and electronic structure changes in vanadium oxide thin films," *Phys. Rev. B* 2008; 77: Art. 195442 (5 pages); and Wang S et al., "Porous monodisperse $V_2O_5$ microspheres as cathode materials for lithium-ion batteries," *J. Mater. Chem.* 2011; 21:6365-9, each of which is incorporated herein by reference in its entirety.

The precursor can be dispensed on a substrate prior to the annealing step in any useful manner. Exemplary techniques include casting, spin coating, dipping, painting, spraying, etc. Optionally, prior to dispensing, the precursor can be dispersed in a solvent (e.g., an alcohol, such as methanol, ethylene glycol, poly(ethylene glycol) diacrylate, etc.) or a matrix (e.g., a polymeric carrier, a gel carrier, etc.) having one or more optional components (e.g., a curing agent, a photoinitiator, etc.). Alternatively, the precursor can be transformed into the crystalline form, which is then dispersed into a matrix (e.g., any described herein). The dispensed coating or film can have any useful thickness (e.g., a thickness that does not hinder or inhibit visible light transmission).

Crystalline Vanadium Oxide

The present invention relates to methods, processes, and systems for forming coatings having crystalline vanadium oxide. The crystalline material of $V_xO_y$ can have any useful stoichiometry (e.g., x is of from 1 to 2, y is of from 2 to 5, such as in vanadium dioxide $VO_2$, vanadium sesquioxide $V_2O_3$, vanadium monoxide VO, and divanadium pentoxide $V_2O_5$) and/or form (e.g., tetragonal form above $T_c$). In particular embodiments, the $V_xO_y$ has a stoichiometry that provides for a metal-insulator-transition (MIT) material (e.g., $VO_2$). Accordingly, exemplary crystalline $V_xO_y$ includes $VO_2$, VO, $V_2O_3$, $V_4O_7$, etc. In some embodiments, one or more dopants are present (e.g., any dopant(s) described herein). In other embodiments, the crystalline material includes $VO_2$ and one or more donor dopants to lower $T_c$ (e.g., $T_c$<68° C.). In yet other embodiments, the material includes $V_4O_7$ and one or more acceptor dopants to increase $T_c$ (e.g., $T_c$>−23° C.). In some embodiments, $T_c$ is about 20° C. or about 25° C. In other embodiments, $T_c$ is of from about 10° C. to about 40° C. (e.g., from 10° C. to 20° C., 10° C. to 25° C., 10° C. to 30° C., 15° C. to 20° C., 15° C. to 25° C., 15° C. to 30° C., 15° C. to 40° C., 20° C. to 25° C., 20° C. to 30° C., 20° C. to 40° C., 25° C. to 30° C., 25° C. to 40° C., or 30° C. to 40° C.).

Optionally, the crystalline vanadium oxide is dispersed in a matrix, e.g., a matrix including one or more gels, sol gels, silica, thermoplastics, resins, and/or polymers, thereby forming a coating or a film on a substrate. Exemplary substrates include glass (e.g., a silicate or borosilicate glass), a polymer (e.g., an acrylate), a metal, a semiconductor (e.g., a III-V semiconductor, silicon, germanium, gallium arsenide, silicon carbide, indium phosphide, or aluminum nitride), an insulator (e.g., silicon dioxide, aluminum oxide, silicon nitride, or sapphire), an oxide (e.g., titanium dioxide), a fiberglass (e.g., one or more glass fibers embedded in a polymeric or plastic matrix), as well as composites, alloys, laminates, coated forms, or multilayered forms thereof.

In one non-limiting embodiment, a crystalline $VO_2$ powder is first synthesized as small spheres (e.g., sub-micron spheres, nanoparticles, or microparticles) of $VO_2$ (T), which when cooled will be in $VO_2$ (M) form. Then, this powder is added to a dispersible matrix, e.g., an organic polymer or any described herein. Next, this mixture (e.g., as a paint) is applied to the desired item or substrate (e.g., a glass, a fiberglass, a plastic, or a skylight).

The presence of crystalline vanadium oxide can be determined by any useful metric. For instance, crystallinity can be determined by lattice parameters and/or thermal coefficients. Other metrics include mid-infrared reflectivity, transmittance, conductivity, transition temperature $T_c$, etc. Such metrics can be determined by any useful technique, e.g., differential scanning calorimetry, near IR spectroscopy, IR spectroscopy, IR scattering scanning near-field optical microscopy, atomic force microscopy, Raman spectroscopy, x-ray diffraction (e.g., HTXRD), etc. Exemplary metrics and techniques are described in Kucharczyk D et al., "Accurate X-ray determination of the lattice parameters and the thermal expansion coefficients of $VO_2$ near the transition temperature," *J. Appl. Cryst.* 1979; 12: 370-3; Arcangeletti E et al., "Evidence of a pressure-induced metallization process in monoclinic $VO_2$," *Phys. Rev. Lett.* 2007; 98:Art. 196406 (4 pages); and Zhang Z et al., "Thermochromic $VO_2$ thin films: Solution-based processing, improved optical properties, and lowered phase transformation temperature," *Langmuir* 2010; 26(13):10738-44, each of which is incorporated herein by reference in its entirety.

Methods of Preparation

As described herein, the present methods employ controlled $O_2$ pressure in order to control the stoichiometry of crystalline vanadium oxide. In particular embodiments, by controlling the O$_2$ partial pressure (pO$_2$), the synthesis methods can be simplified to a single step to form the desired crystalline product. In other embodiments, these methods allow for formation of the desired product at reduced O$_2$ partial pressure and/or reduced annealing temperature.

Figure 5:
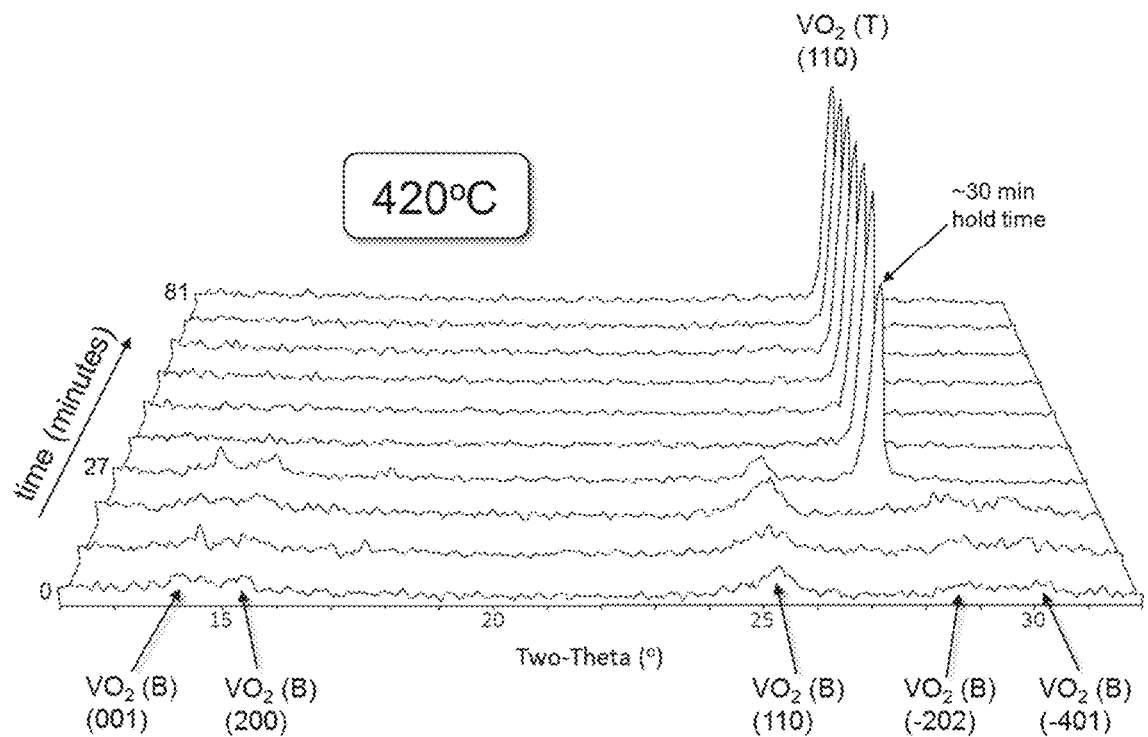
FIG. 5 is a graph showing an isothermal hold experiment of VOP precursor at $pO_2$~50 ppm and 420° C. These conditions results in the formation of a fine grained metastable monoclinic form of $VO_2$ ("$VO_2$ (B)"), followed by sudden conversion to the tetragonal form of $VO_2$ ("$VO_2$ (T)") after 30 minutes of hold time.

FIG. 5 shows an exemplary method of the invention. As can be seen, the desired crystalline vanadium oxide product has a characteristic ~27.6° 2θ peak at 420° C. This exemplary, simplified method includes annealing the precursor at a rapid rate (about 100° C./min) to a hold temperature of 420° C. at a pO$_2$ of about 50 ppm.

The present method can be performed at any useful temperature, including a reduced temperature or hold temperature, e.g., a temperature of from about 200° C. to about 500° C. In particular embodiments, the method employs one and only one hold temperature to convert the precursor to the desired crystalline vanadium oxide. Exemplary reduced temperatures or hold temperature include of from about 200° C. to about 500° C., such as from 200° C. to 250° C., 200° C. to 300° C., 200° C. to 350° C., 200° C. to 400° C., 200° C. to 450° C., 250° C. to 300° C., 250° C. to 350° C., 250° C. to 400° C., 250° C. to 450° C., 250° C. to 500° C., 300° C. to 350° C., 300° C. to 400° C., 300° C. to 450° C., 300° C. to 500° C., 350° C. to 400° C., 350° C. to 450° C., 350° C. to 500° C., 400° C. to 450° C., 400° C. to 500° C., or 450° C. to 500° C.

Any useful pO$_2$ can be employed to obtain the desired oxide stoichiometry. For instance, reduced pO$_2$ can be used to slow reaction kinetics and vanadium oxide formation, thereby ensuring that higher purity materials of the desired stoichiometry are obtained. Exemplary pO$_2$ includes from about 2 ppm to about 500 ppm (e.g., from 2 ppm to 50 ppm, 2 ppm to 100 ppm, 2 ppm to 250 ppm, 10 ppm to 50 ppm, 10 ppm to 100 ppm, 10 ppm to 250 ppm, 10 ppm to 500 ppm, 20 ppm to 50 ppm, 20 ppm to 100 ppm, 20 ppm to 250 ppm, 20 ppm to 500 ppm, 30 ppm to 50 ppm, 30 ppm to 100 ppm, 30 ppm to 250 ppm, 30 ppm to 500 ppm, 40 ppm to 50 ppm, 40 ppm to 100 ppm, 40 ppm to 250 ppm, or 40 ppm to 500 ppm).

Any useful annealing time can be employed (e.g., from about 5 minutes to about 72 hours, such as 5 minutes to 10 minutes, 5 minutes to 15 minutes, 5 minutes to 30 minutes, 5 minutes to 1 hour, 5 minutes to 6 hours, 5 minutes to 12 hours, 5 minutes to 18 hours, 5 minutes to 24 hours, 5 minutes to 36 hours, 5 minutes to 48 hours, 15 minutes to 30 minutes, 15 minutes to 1 hour, 15 minutes to 6 hours, 15 minutes to 12 hours, 15 minutes to 18 hours, 15 minutes to 24 hours, 15 minutes to 36 hours, 15 minutes to 48 hours, 30 minutes to 1 hour, 30 minutes to 6 hours, 30 minutes to 12 hours, 30 minutes to 18 hours, 30 minutes to 24 hours, 30 minutes to 36 hours, 30 minutes to 48 hours, 30 minutes to 72 hours, 1 hour to 12 hours, 1 hour to 18 hours, 1 hour to 24 hours, 1 hour to 36 hours, 1 hour to 48 hours, 1 hour to 72 hours, 2 hours to 12 hours, 2 hours to 18 hours, 2 hours to 24 hours, 2 hours to 36 hours, 2 hours to 48 hours, 2 hours to 72 hours, 6 hours to 12 hours, 6 hours to 18 hours, 6 hours to 24 hours, 6 hours to 36 hours, 6 hours to 48 hours, 6 hours to 72 hours, 12 hours to 18 hours, 12 hours to 24 hours, 12 hours to 36 hours, 12 hours to 48 hours, 12 hours to 72 hours, 18 hours to 24 hours, 18 hours to 36 hours, 18 hours to 48 hours, 18 hours to 72 hours, 24 hours to 36 hours, 24 hours to 48 hours, 24 hours to 72 hours, 36 hours to 48 hours, 36 hours to 72 hours, and 48 hours to 72 hours). For instance, as shown in FIG. 5, isothermal hold experiments show initial formation of the B form of VO$_2$, followed by formation of the T form for up to about one hour. Similar experiments can be performed to determine the optimal annealing time. In addition, a rapid annealing rate can be employed to ensure that a single hold temperature controls the conversion of the precursor to the desired crystalline vanadium oxide.

The annealing rate can be, e.g., of from about 1° C. per minute to about 200° C. per minute. Other exemplary rates includes from 1° C. per minute to 5° C. per minute, 1° C. per minute to 10° C. per minute, 1° C. per minute to 25° C. per minute, 1° C. per minute to 50° C. per minute, 1° C. per minute to 75° C. per minute, 1° C. per minute to 100° C. per minute, 1° C. per minute to 150° C. per minute, 5° C. per minute to 10° C. per minute, 5° C. per minute to 25° C. per minute, 5° C. per minute to 50° C. per minute, 5° C. per minute to 75° C. per minute, 5° C. per minute to 100° C. per minute, 5° C. per minute to 150° C. per minute, 5° C. per minute to 200° C. per minute, 10° C. per minute to 25° C. per minute, 10° C. per minute to 50° C. per minute, 10° C. per minute to 75° C. per minute, 10° C. per minute to 100° C. per minute, 10° C. per minute to 150° C. per minute, 10° C. per minute to 200° C. per minute, 25° C. per minute to 50° C. per minute, 25° C. per minute to 75° C. per minute, 25° C. per minute to 100° C. per minute, 25° C. per minute to 150° C. per minute, 25° C. per minute to 200° C. per minute, 50° C. per minute to 75° C. per minute, 50° C. per minute to 100° C. per minute, 50° C. per minute to 150° C. per minute, 50° C. per minute to 200° C. per minute, 75° C. per minute to 100° C. per minute, 75° C. per minute to 150° C. per minute, 75° C. per minute to 200° C. per minute, 100° C. per minute to 150° C. per minute, 100° C. per minute to 200° C. per minute, or 150° C. per minute to 200° C. per minute.

Calibration Protocols

The present invention also includes calibration protocols to obtain the optimum conditions (e.g., optimum hold temperature(s), pO$_2$ value(s), annealing time(s), annealing rate(s), etc.).

Figure 7:
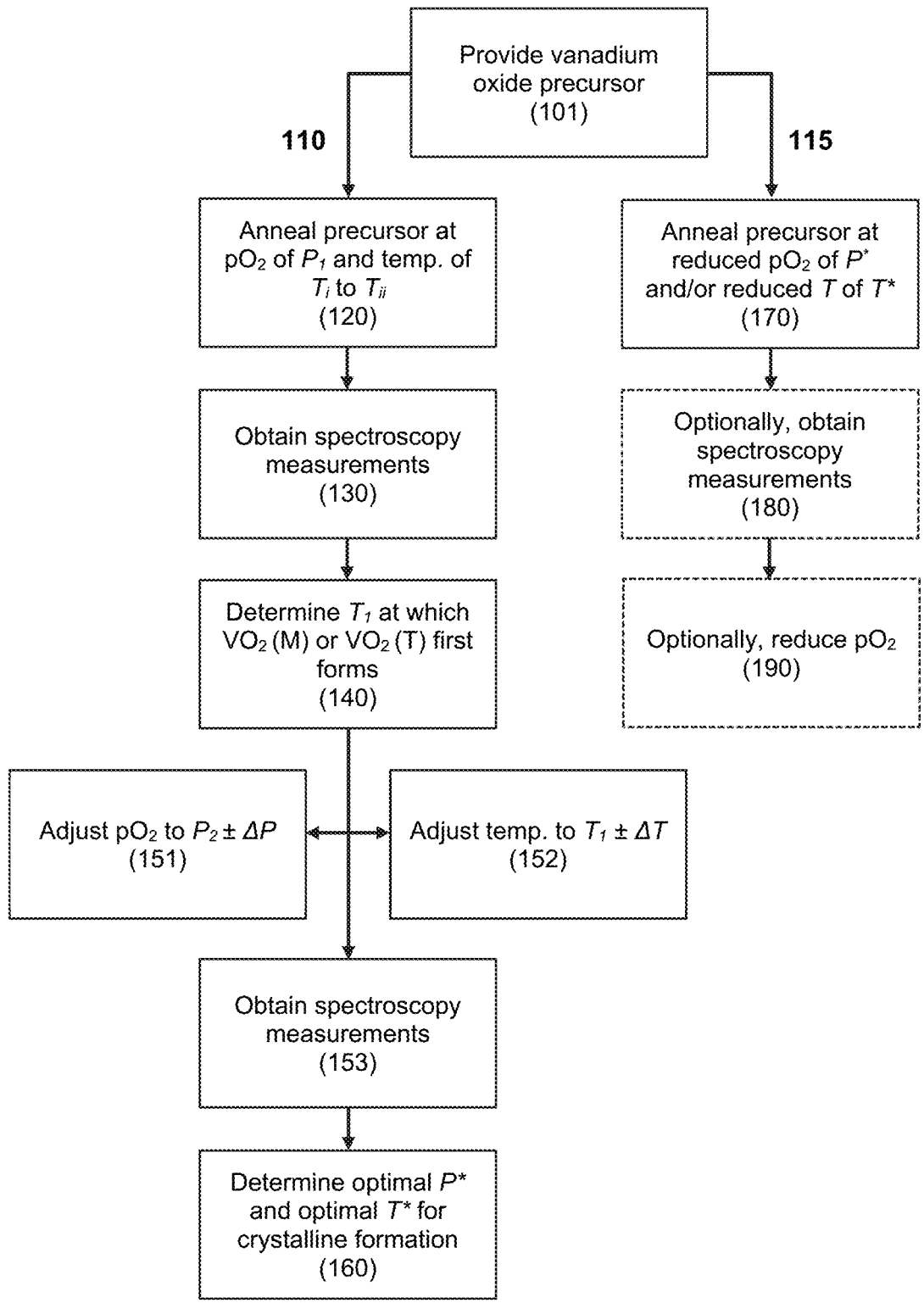
FIG. 7 is a schematic of an exemplary calibration protocol 110 and simplified method 115 for obtaining the desired vanadium oxide material.

An exemplary calibration protocol 110 is provided in FIG. 7. As can be seen, a vanadium oxide precursor is first provided 101. Then, the precursor is annealed 120 at a first pO$_2$ of P$_1$ and at a first temperature T$_1$ (or a first range of temperatures T$_i$ to T$_{ii}$). Next, one or more spectroscopy measurements (e.g., diffraction or calorimetry measurements) can be obtained 130. Based on these measurements, T$_1$ can be determined 140, where T$_1$ is the temperature at which a crystalline vanadium oxide (e.g., an M or T form of VO$_2$) is detected.

Various factors can affect the experimental conditions in which crystalline vanadium oxide can form. For example, the type and amount of the precursor, the gas mixture in the reaction chamber, the substrate upon which the vanadium oxide coating is being formed, the solvent or matrix for the precursor, etc. can all affect the optimal conditions for obtaining the desired crystalline material. As described herein, the precursor can undergo numerous phase transitions between different oxidation states, as well as between different crystalline or amorphous forms. In particular, understanding T$_1$ assists the user in narrowing the vast number of experimental conditions to those that contribute to optimal formation of the crystalline form. As described herein, T$_1$, i.e., the temperature at which a crystalline vanadium oxide is first detected, is the bellwether for conditions that favor the formation of high purity, crystalline vanadium oxide.

Upon knowing T$_1$, the user can maintain T$_1$ while reiteratively adjusting pO$_2$ to partial pressures P$_2$±ΔP 151 and obtaining spectroscopy measurement(s) 153 to understand what phases are being formed. In particular, pO$_2$ can be reduced to control kinetic formation of lower oxygen species, such as $VO_2$. If the majority of the detected species includes lower oxidation species (e.g., $V_2O_3$), then $pO_2$ can be increased. In this manner, optimal $pO_2$ conditions can be determined.

Spectroscopy measurements 153 can be obtained in any useful manner. Exemplary techniques include crystal diffraction, such as x-ray diffraction (XRD) or high temperature x-ray diffraction (HTXRD); and calorimetry, such as heat of fusion or melting point determinations.

In addition, the user can reiteratively adjust the annealing temperature to $T_1 \pm \Delta T$ 152 to further optimize the annealing hold temperature and obtain further spectroscopy measurement(s) 153. Steps 151, 152, and 153 can be repeated any number of n times (e.g., n is 5, 10, 15, 20, 25, etc.), where each $n^{th}$ step is conducted at annealing temperature of $T_n$ and $pO_2$ of $P_n$. In particular embodiments, each $T_n$ at each $n^{th}$ step is determined as follows: $T_n = +\Delta T$ or $T_i = n\Delta T$, where $T_i$ is any useful initial temperature (e.g., 0° C., 5° C., 10° C., 50° C., or 100° C.) and $\Delta T$ is any useful temperature step (e.g., 1° C., 5° C., 10° C., 15° C., or 20° C.). In other embodiments, each $P_n$ at each $n^{th}$ step is determined as follows: $P_n = P_{n-1} + \Delta T$ or $P_n = P_i + n\Delta P$, where $P_i$ is any useful initial pressure (e.g., 1 ppm, 2 ppm, 5 ppm, or 10 ppm) and $\Delta P$ is any useful pressure step (e.g., 1 ppm, 2 ppm, 5 ppm, 10 ppm, 15 ppm, or 20 ppm). Steps 151, 152, and 153 can also be performed in any order to obtain optimal conditions for $pO_2$ of P* and/or temperature of T* for crystalline formation 160.

Upon determining the optimal conditions, simplified methods for producing the desired crystalline product 115 can be determined. The method generally includes providing a precursor 101 and annealing the precursor at a reduced $pO_2$ of P* and/or a reduced temperature of T* 170. Optionally, one or more spectroscopy measurement(s) can be obtained 180 and, based on these measurements, the $O_2$ partial pressure can be further adjusted 190 (e.g., reduced to control kinetic formation of lower oxygen species, such as $VO_2$).

Uses

The present invention provides materials and coatings for any use. Exemplary uses include infrared polymer coatings, such as for smart windows; optical or field effect switches; waveguides; optical modulators; optical detectors; circuit components, such as nonlinear circuit components; solid state sensors; memristors; catalysts; metamaterials; as well as any other application for MIT materials, such as those described in Yang Z et al., "Oxide electronics utilizing ultrafast metal-insulator transitions," *Annu. Rev. Mater. Res.* 2011; 41:337-67, which is incorporated herein by reference in its entirety.

In some embodiments, the material is used for smart windows, in which dopants within this $VO_2$ material tailor it for IR reflectance above approximately room temperature. In particular, the material allows visible light and IR (e.g., heat) transmission through the window and into a room at low external temperatures (e.g., below about 25° C.), thereby providing light and heat. However, at high external temperatures, the material changes into its metallic form, thereby reflecting IR radiation but transmitting visible light. Thus, the material can form an environmentally-switched coating that is tailored to reduce heating due to sunlight exposure but still allow visible light transmission. Using such a coating, one can decouple solar illumination (e.g., optical gain) and heat (e.g., thermal gain) to improve energy efficiency.

System

The present invention also encompasses systems to carry out the methods and protocols of the invention. An exemplary system can include any number of monitors, sensors, gas sources, and chambers to perform any useful method described herein. An exemplary system is provided in FIG. 3, which includes a heated stage and heating chamber, as described herein.

In addition, the system includes one or more gas sources, including an oxygen source configured to supply $O_2$ within the heating chamber, where the oxygen source can be a gaseous mixture including $O_2$ (e.g., a 500 ppm $O_2$ in $N_2$). Optionally, the gas source also includes an inert gas (e.g., He, $N_2$, and/or Ar) and an optional $O_2$ getter.

The system can include one or more oxygen monitors configured to detect one or more $O_2$ partial pressure values within the heating chamber. Optionally, the monitor is further configured to transmit the $O_2$ partial pressure value(s). The monitor can measure the gas partial pressure and provide a feedback reference measurement. In particular, the gauge is one that responds rapidly to the $O_2$ partial pressure. Exemplary gauges include an optical emission sensor (OES) (e.g., a Penning gauge), a CCD, a lambda sensor, a baratron, etc.

In order to control $pO_2$, a feedback controller can be present. The controller is a unit configured to receive one or more inputs, such as $pO_2$ measurements, and apply one or more algorithms to determine whether the amount of a gas (e.g., $O_2$) in the system should be increased, decreased, or maintained. If the determination requires an increase or a decrease, then the feedback controller transmits one or more outputs, such as a gas flow control signal, which activates an actuator to open or close a valve or gas line connected to a gas supply. In this way, the feedback controller interacts with the gauge and actuator to maintain optimal partial pressure of the desired gas (e.g., $O_2$). Exemplary inputs for the feedback controller include measured $O_2$ partial pressure, target voltage, plasma spectrum, etc. Exemplary outputs for the feedback controller include an $O_2$ flow control signal (e.g., with partial pressure control), a reactive gas flow signal, a target voltage, or a target power output.

The algorithm for the feedback controller can include any useful parameters, such as one or more control loops (e.g., as in a pseudo-derivative feedback algorithm), time response(s), actuation times(s), voltage setpoint(s), etc. In particular embodiments, the algorithm features a digital variable structure control law that is able to maintain fast-acting and stable control, even when the actuator becomes fully open or closed. Exemplary algorithms and advanced multichannel reactive plasma gas feedback controllers are described in Bellido-Gonzalez V et al., "Reactive gas control of non-stable plasma conditions," *Thin Solid Films* 2006; 502:34-9, which is incorporated herein by reference in its entirety. Commercially available feedback controller systems include, for instance and without limitation, the SPEEDFLO™ system (a commercially available feedback controller system) from Gencoa Ltd., Liverpool, UK.

One or more actuators can be present to control the flow rate of one or more reactive gases (e.g., $O_2$). An exemplary actuator includes a mass flow controller (MFC) having an input port, an output port, a mass flow sensor that measures flow between the input and output ports, and a control valve configured to be upstream of the output port and to respond to the output(s) of the feedback controller. The actuator can be configured to transmit one or more signals to a valve that controls $O_2$ flow for the oxygen source.

EXAMPLE

Example 1: In-Situ Monitoring of Vanadium Oxide Formation Using High Temperature XRD The monoclinic-to-tetragonal phase transition (~70° C.) in $VO_2$ strongly impacts the IR properties of the $VO_2$ compound, which enables its use in applications, such as smart window devices. Synthesis of $VO_2$ can be challenging due to the variability of vanadium oxide phases that may be formed. We employed high temperature x-ray diffraction (HTXRD) to monitor the reaction process of Vanadium Oxide Precursor (VOP) powders to form the desired tetragonal $VO_2$ phase. Single phase tetragonal $VO_2$ was observed to form within 30 minutes at 420° C. in flowing $N_2$ gas (~50 ppm $O_2$). The monoclinic-to-tetragonal phase transformation was observed via HTXRD to occur at ~70° C. with the typical ~10° C. hysteresis (i.e., approached from above or below the transition). Additional details follow.

Due to vanadium's variable oxidation state, many different phases of vanadium oxide exist. In addition to stoichiometric variation, one observes different polymorphs for the same chemical formula, further extending the possible phases of vanadium oxide. Such a rich variety of stoichiometries and structures ultimately has an impact on the observed properties and performance of these materials.

One particular stoichiometry, $VO_2$, shows Metal-Insulator Transition (MIT) type behavior. These so-called MIT materials display radical changes in electrical and optical properties as a result of a structural phase transition. For example, a phase transformation (monoclinic-to-tetragonal) in $VO_2$ at ~70° C. displays a $10^4$ to $10^5$ magnitude increase in electrical conductivity (see, e.g., Lu Z et al., *J. Mater. Chem.* 2011; 21:14776-82). Concurrent with the change in electrical conductivity is a corresponding change in optical properties (Yang Z et al., *Annu. Rev. Mater. Res.* 2011; 41:337-67).

In particular, the monoclinic $VO_2$ phase displays good optical transmission in visible and near infrared (IR) ranges. In contrast, the tetragonal form (above ~70° C.) shows a very sharp decrease in the IR spectrum. These dramatic and reversible property changes can be tailored into engineering applications such as optical switches, sensors, and window coatings (see, e.g., Briggs R M et al., "Compact silicon photonic waveguide modulator based on the vanadium dioxide metal-insulator phase transition," *Optics Express* 2010 May; 18(11):11192-201; Yang Z et al., *Annu. Rev. Mater. Res.* 2011; 41:337-67; and Manning T D et al., *Chem. Mater.* 2004; 16:744-9).

Figure 1:
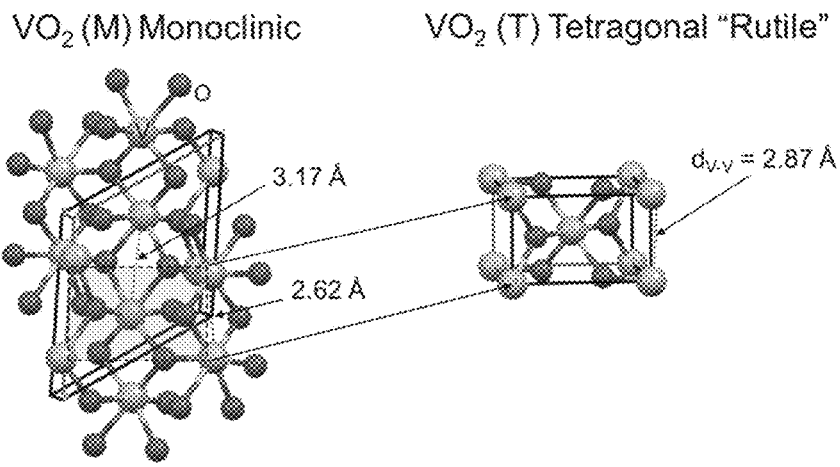
FIG. 1 is a schematic showing $VO_2$ in monoclinic (left) and tetragonal (right) form. As can be seen, the monoclinic M1 form has two distinct V—V bond distances, whereas the tetragonal T form displays the rutile-like structure and has a single V—V bond distance ($d_{v-v}$).

FIG. 1 shows the crystal structures of the $VO_2$ MIT-paired phases. At room temperature, $VO_2$ displays a monoclinic structure (FIG. 1, left). This monoclinic phase, hereafter referred to as $VO_2$ (M), is characterized by alternating V—V distances within the lattice; the structure shows a short V—V distance (2.62 Å) and a relatively long V—V distance (3.17 Å). The differing V—V bond lengths affect the electronic band structure, resulting in semiconducting behavior for the $VO_2$ (M) compound (Lazarovits B et al., "Effects of strain on the electronic structure of $VO_2$," *Phys. Rev. B* 2010; 81: Art. 115117 (9 pages)). In contrast, the tetragonal form of $VO_2$ (FIG. 1, right) has a more simplified Rutile-type structure and uniform V—V bond distances (2.87 Å). This tetragonal $VO_2$, hereafter referred to as $VO_2$ (T), displays low electrical resistivity as well as a decrease in transmission of the near-IR wavelengths (Lu Z et al., *J. Mater. Chem.* 2011; 21:14776-82).

The suppression of IR transmission with temperature makes $VO_2$ an interesting material for smart window applications. Manning et al., in *Chem. Mater.* 2004; 16:744-9, showed that tungsten-doped $VO_2$ window coatings could suppress IR transmission at temperatures above the MIT transition. Of late, there has been interest in the synthesis of $VO_2$ nanoparticles for fabrication of low-cost coatings for windows to passively reduce heat transmission (see, e.g., Yamamoto S et al., "Preparation of monodisperse and spherical rutile $VO_2$ fine particles," *Chem. Mater.* 2009; 21:198-200).

While nanoparticle synthesis has been successful, the demands concerning control of temperature and partial pressure of oxygen ($pO_2$) during synthesis are evident in some of the more elaborate processing profiles. For example, the route described by Lu Z et al., *J. Mater. Chem.* 2011; 21:14776-82, involves heat treatment of chemically prepared vanadium oxide precursor powder to 300° C. in air to form $V_2O_5$, with subsequent reduction in $H_2$ at 400° C. (forming $V_2O_3$) followed by an anneal in $N_2$ gas at 400° C. to form the desired $VO_2$ composition. This complicated synthetic route requires multiple heating steps with different gases.

Here, we describe $VO_2$ material synthesis having reduced complexity. The synthesis herein is a single processing schedule that employs in-situ high temperature x-ray diffraction (HTXRD) characterization. HTXRD is used to monitor the various phases that can form under differing time-temperature-$pO_2$ conditions, although any useful spectroscopic technique can be employed. In this way, we can identify and establish the proper conditions that provide stable formation of $VO_2$ (T) as a single phase. This understanding greatly reduces the complexity (and cost) of material synthesis. To facilitate this discussion, Table 1 gives a summary of all observed vanadium oxide phases, their corresponding Powder Diffraction File (PDF) entries (International Centre for Diffraction Data (ICDD), 2010), and their structural references.

TABLE 1

Vanadium oxide phases

| Phase | PDF entry | Reference |
|---|---|---|
| $V_2O_3$ | 04-004-2833 | Vincent M G et al., "Electron-density studies of metal-metal bonds. II. The deformation density of $V_2O_3$ at 295K," *Acta Cryst.* 1980; A36:808-13. |
| $VO_2$ (M) | 00-043-1051 | Longo J M et al., "A refinement of the structure of $VO_2$," *Acta Chem. Scand.* 1970; 24:420-6. |
| $VO_2$ (B) | 04-007-0514 | Oka Y et al., "Phase transition and $V^{4+}$-$V^{4+}$ pairing in $VO_2$(B)," *J. Solid State Chem.* 1993; 105:271-8. |
| $VO_2$ (T) | 01-079-1655 | Rogers K D, "An X-ray diffraction study of semiconductor and metallic vanadium dioxide," *Powder Diffr.* 1993 December; 8(4):240-4. |
| $V_6O_{13}$ | 04-007-1362 | Wilhelmi K A et al., "A refinement of the crystal structure of $V_6O_{13}$," *Acta Chem. Scand.* 1971; 25:2675-87. |
| $V_3O_7$ | 04-007-0598 | Waltersson K et al., "The crystal structure of $V_3O_7$," *Acta Cryst.* 1974; B30:2644-52. |
| $V_2O_5$ | 00-041-1426 | Enjalbert R et al., "A refinement of the structure of $V_2O_5$," *Acta Cryst.* 1986; C42:1467-9. |

Vanadium Oxide Precursor (VOP) Synthesis:

Vanadium (V) oxytriethoxide (95%; Aldrich), anhydrous pyridine (99.8%; Sigma-Aldrich), and acetone (99.8%, extra dry; Acros) were all used as received. Deionized water was purified using a Millipore Synergy 185 system to 18.2 MΩ resistance. The precipitation procedure for monodisperse vanadium oxide precursor (VOP) particles was adapted from Yamamoto S et al., *Chem. Mater.* 2009; 21:198-200. Within an argon glove box, 13 ml of pyridine was measured into a beaker, and 185 µl of vanadium (V) oxytriethoxide was added to create a yellow, transparent solution. A second beaker was used to mix 24 ml of acetone with 30 µl of water. A magnetic stir-bar was used for mixing in the acetone-water solution as the pyridine-vanadium solution was added by rapid pouring. An opaque, orange precipitate formed immediately. The solution was allowed to stir for 30 minutes, after which it was transferred to a polyethylene centrifugation tube, and removed from the glovebox. The precipitate was recovered and washed using three cycles of centrifugation and redispersion using pure acetone.

Figure 2:
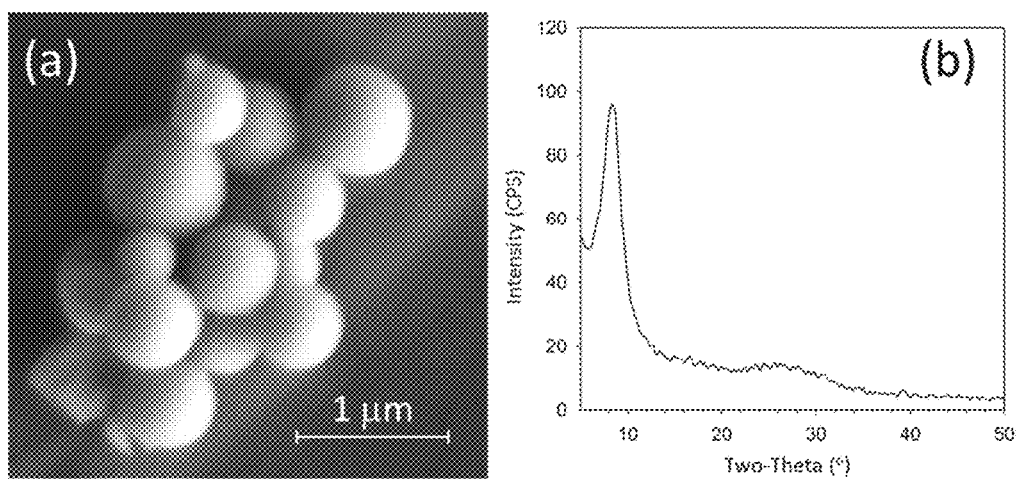
FIG. 2 shows characterization of an exemplary vanadium oxide precursor (VOP) powder. Provided are (a) an SEM image of dried VOP powder showing spherical morphology and (b) an x-ray diffraction pattern showing a broad, low-angle peak (~8.3° 2θ) characteristic of the VOP precursor.

The final VOP powder was allowed to air dry overnight in a drying oven set to 90° C. Scanning Electron Microscopy (SEM) of the VOP powder was performed using a Carl Zeiss SUPRA™ 55VP SEM (10 to 20 kV; 8.5 mm working distance; a commercially available scanning electron microscopy system). SEM images were employed to assess the morphology of the generated VOP precursor. FIG. 2(*a*) shows an image of the dried VOP particles illustrating the anticipated spherical morphology and submicron dimensionality. Preliminary XRD analysis of the room temperature VOP material (prior to in-situ heat treatment) confirmed the observation of a broad diffraction peak at ~8.3° 2θ characteristic of the nanocrystalline VOP material. This material was used in subsequent in-situ high-temperature XRD analysis. It is worth noting here that timely harvesting and drying of the VOP precipitate (i.e., <3 hours after precipitate formation) was necessary to assure the spherical shape of the nanocrystallite particles and observe the broad 8.3° 2θ peak in the initial XRD pattern. If harvesting was postposed, recrystallization of VOP material occurred and the spherical morphology was lost in favor of larger single crystals (>1 µm) with a bladed morphology.

High Temperature X-Ray Diffraction:

High temperature XRD experiments were performed using a Scintag PAD X 0-0 diffractometer (Thermo Electron Inc.; Waltham, Mass.). This diffractometer was equipped with a sealed-tube source (Cu Kα radiation), an incident-beam mirror optic, a peltier-cooled Ge solid-state detector, and a Buehler hot-stage with Pt/Rh heating strip and surround heater. X-ray generator settings were 40 kV and 30 mA, and fixed slits were employed.

Temperature calibration was performed using thermal expansion behavior of known materials (e.g. alumina) and calibrated to ±5° C. The heating chamber was configured to handle mixed gas atmospheres, for example, inert (helium), $N_2$, air, and $N_2/O_2$ mixtures. The helium (inert) gas was run through an oxygen getter to reduce the $pO_2$ to below 1 ppm. An oxygen monitor was placed on the downstream side of the chamber to monitor $pO_2$ during the experiments, and the $pO_2$ values were calibrated using certified $N_2/O_2$ gas mixtures.

Figure 3:
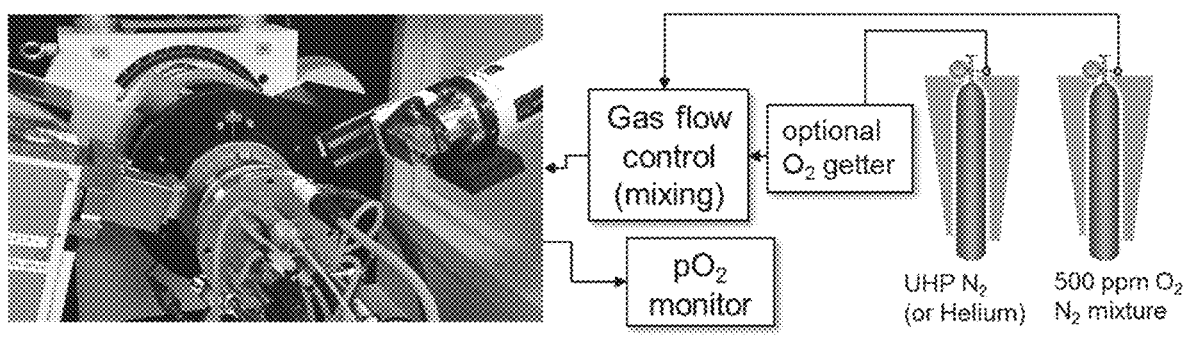
FIG. 3 shows a picture and a schematic for an exemplary high temperature x-ray diffraction (HTXRD) system for in-situ XRD analysis.

FIG. 3 shows a photo of the Buehler hot stage mounted on the diffractometer as well as a schematic of the gas handling system that was used. To prepare a sample for HTXRD, the dried VOP powder was dispersed in methanol, and a dropper was used to deposit this slurry as a thin layer onto 1 $cm^2$ Si single-crystal substrates. Once the sample was dry, it was placed directly on the hot stage. Samples were typically heated using a 20° C./min ramp rate to the desired analysis temperature. Diffraction patterns were collected over a scan range of 20-80° 2θ at a step-size of 0.04° 2θ and a count time of 1 second. Typical scans were collected in ~30 minute increments.

Results and Discussion:

Determination of the proper conditions for synthesis of $VO_2$ (T) was an iterative process. Many experiments were performed to map out the reaction progression, determine observed phases, and ultimately fine-tune the time-temperature-$pO_2$ conditions to obtain phase pure $VO_2$ (T) at temperature. The VOP precursor material had a spherical appearance after initial synthesis as illustrated in FIG. 2(*a*).

For potential applications of the $VO_2$ material, it was desirable to maintain, as much as possible, the spherical and submicron nature of the VOP particle morphology. Therefore, obtaining full conversion to $VO_2$ (T) while simultaneously preventing particle sintering was paramount for the processing protocol, and it was desired that this occur at the lowest temperature and shortest time possible. Typical in-situ HTXRD measurements involved a fixed $pO_2$ setting with XRD scans occurring over a set of steps in temperature (e.g., 100° C., 120° C., 140° C., etc.). This type of experiment will hereafter be referred to as a "step-series." Typically, the temperature steps were in 20° C. increments.

Two step-series experiments were performed. The first step-series experiment was performed under gettered helium (inert) gas with a $pO_2$ of <1 ppm. The result (FIG. 4B) was the formation of $V_2O_3$ at ~450° C. The $V_2O_3$ phase persisted up to 600° C. and higher. A second step-series was performed in air and showed formation of $V_2O_5$ as low as ~240° C. This $V_2O_5$ phase remained present over all measured temperatures up to melting (~680° C.). These two measurements bracketed the extremes of the processing and indicated that adjustment in $pO_2$ should allow isolation of the correct $VO_2$ stoichiometry.

Figure 4A:
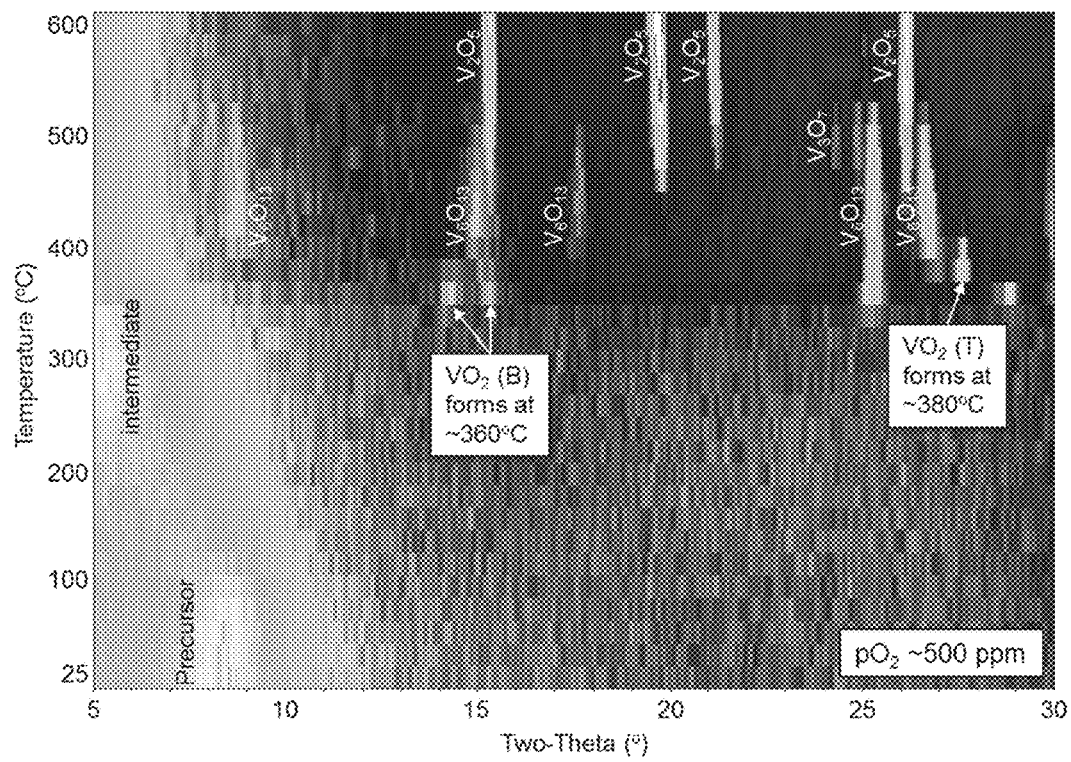
FIG. 4A-4B shows contour plots for in-situ heat treatment of VOP powder.
Figure 4B:
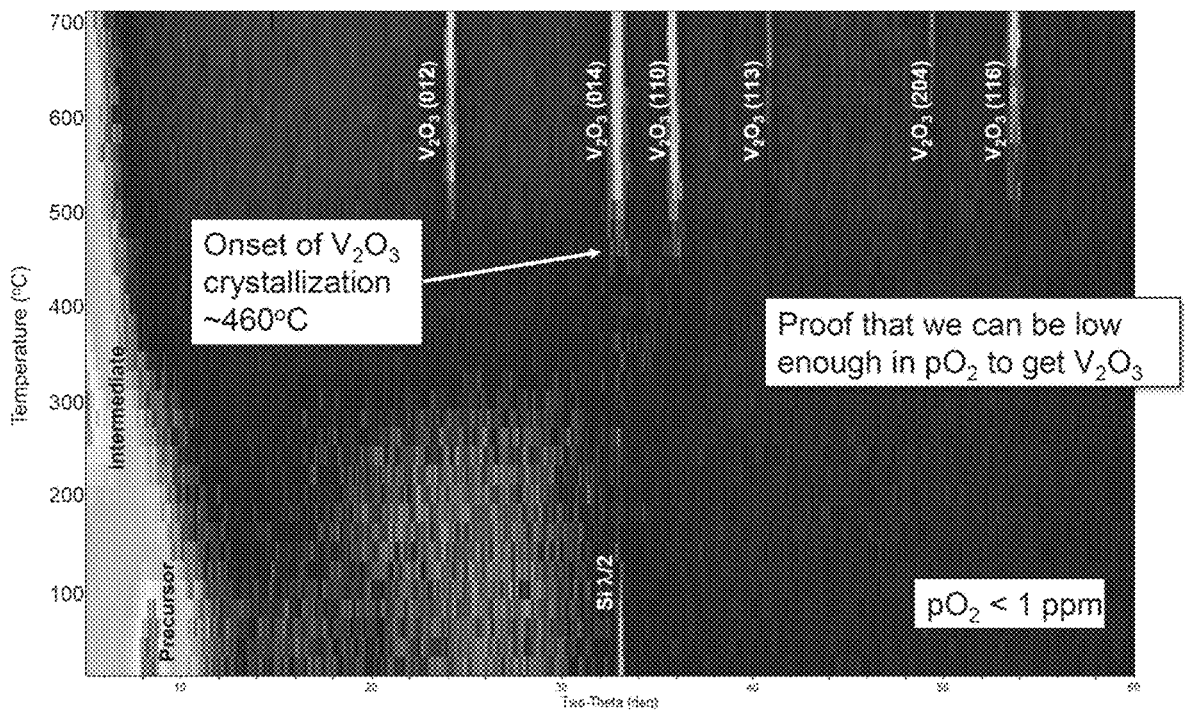

FIG. 4A shows the results of the step-series for $pO_2$ of ~500 ppm $O_2$. This plot shows XRD scans as a contour plot. Temperature increases as one steps from the bottom to the top of the figure. This result illustrates the plethora of phases that occur during heating of the VOP material in this $pO_2$ range. Below 100° C., the broad VOP "precursor" peak is present at ~8.3° 2θ, similar to that observed in FIG. 2(*b*). Above 100° C., this peaks decays, and the sample remains essentially amorphous until ~220° C., at which point an intermediate phase forms.

This intermediate phase is characterized by a broad peak just above 5° 2θ and appears to grow in concentration up to 320° C. This intermediate phase then decays just prior to the formation of $VO_2$ at ~360° C.

At 360° C., crystalline $VO_2$ is first detected, but not as $VO_2$ (T). Instead, one first observes a metastable monoclinic form of $VO_2$ referred to as $VO_2$ (B). This has also been observed by Yamamoto S et al., *Chem. Mater.* 2009; 21:198-200. During the synthesis of $VO_2$ (T), they observed that $VO_2$ (B) typically precedes the observation of $VO_2$ (T). Hence, observation of $VO_2$ (B) serves as a bellwether for eminent $VO_2$ (T) formation. The structure of $VO_2$ (B) is detailed by Oka Y et al., *J. Solid State Chem.* 1993; 105:271-8.

FIG. 4A shows that further progression up in temperature to 380° C. yields formation of $VO_2$ (T); this is characterized by the peak at ~27.6° 2θ, which indexes to the (110) of the $VO_2$ (T) phase. This observation is promising, because it confirms that $VO_2$ (T) can be formed at low processing temperatures. However, the downside of this result was that the $VO_2$ (T) was not single-phase. Instead, it coexisted with the $V_6O_{13}$ phase. By 400° C., the $V_6O_{13}$ compound was the dominant phase in the step-series. Clearly, the stability range of $VO_2$ (T) is too small of a processing window for isolation of $VO_2$ (T) under the oxygen concentration of ~500 ppm.

Lowering the $pO_2$ should aid in expanding the stability range for $VO_2$ (T) since this would kinetically suppress the reaction-rate through the absence of sufficient oxygen. This will be shown to be true in the discussion of FIG. 5.

To finish out the discussion of FIG. 4A, one can see that the $V_6O_{13}$ phase transforms to $V_3O_7$ at ~480° C. However, there are also signs of $V_2O_5$ formation as early as 460° C. These three phases coexist up to 500° C. and by 520° C. only $V_2O_5$ remains present.

Slowing down the kinetics of phase formation by reduced $pO_2$ was a successful strategy for isolating $VO_2$ (T) phase formation. The HTXRD experimental design changed at this point to performing isothermal holds at a set $pO_2$ condition. In this case, the sample was heated rapidly (~100° C./min) to the hold temperature, followed by immediate and continual collection of XRD scans once the set-point was reached. HTXRD scans employed a shortened 2θ range so as to obtain as much detail about the phase change behavior as possible during the hold time. Typical isothermal hold experiments employed scans that required ~9 min to collect, and the duration of the soak time at temperature was ~1.5 hours allowing for 10 scans during this duration. Various $pO_2$ values and set-point temperatures were attempted.

FIG. 5 shows the best results for rapid and controlled $VO_2$ (T) formation. In this isothermal hold experiment, the $pO_2$ was set to 50 ppm $O_2$, and the hold temperature was set at 420° C. As the figure illustrates, $VO_2$ (B) is the only phase observed during the first three scans (0-27 minutes). Notice too that the $VO_2$ (B) peaks are broad, suggesting reduced crystallite size. During the fourth scan in the series, we observed decay of the $VO_2$ (B) phase and dramatic formation of $VO_2$ (T). Subsequent scans revealed only $VO_2$ (T) and no additional (higher oxidation state) phases. This result illustrates a simple processing protocol for low-temperature synthesis of $VO_2$ (T) directly from VOP powder and does not require a multi-step oxidation/reduction procedure. The processing window appears to be wide; the $VO_2$ (T) phase will form and remain single phase for significant duration of time (e.g., at least 1 hour as shown in FIG. 5).

Upon formation of the $VO_2$ (T) sample documented in FIG. 5, the sample was cooled down to room temperature; it showed transformation to the monoclinic form $VO_2$ (M) as expected. To test the phase transition behavior of the $VO_2$ between monoclinic and tetragonal, the sample was reheated in an air atmosphere on the hot stage setup (FIG. 3) in an attempt to capture the conversion of $VO_2$ (M) to $VO_2$ (T).

Figure 6:
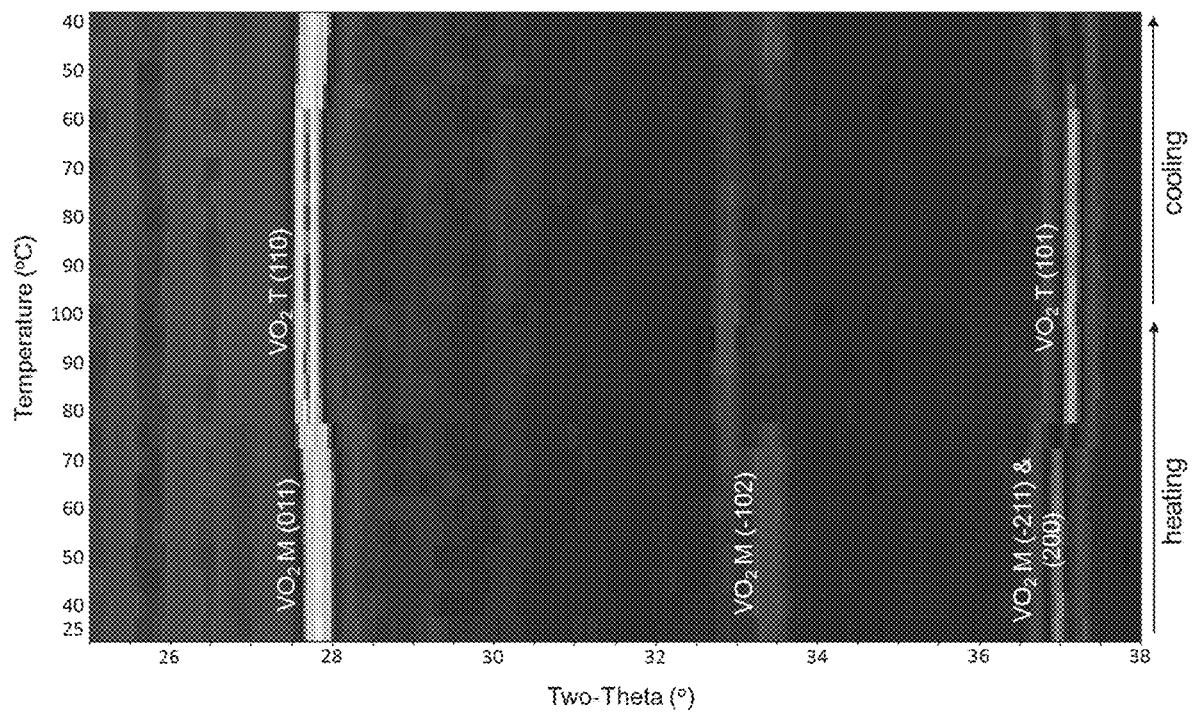
FIG. 6 is a contour plot of monoclinic ($VO_2$ M) and tetragonal ($VO_2$ T) phase transformation of $VO_2$ between room temperature and 100° C. (air atmosphere). Darker regions generally indicate lower counts.

In this step-series experiment, the temperature steps were in smaller (5° C.) increments to capture the onset of the transition. FIG. 6 reveals the outcome of this step-series. Diffracted intensity was plotted as a grayscale, where dark regions generally indicate low counts, and light regions generally indicate high counts. Temperature is plotted along the y-axis with the initial room temperature scan at the bottom of the plot. During this experiment, the temperature was raised up to 100° C. during the first 14 XRD scans, labeled as the "heating" portion (see label on right side of FIG. 6). Then, the sample was cooled back down to ~40° C. (labeled as "cooling" on the right of FIG. 6). Both heating and cooling were monitored so as to capture the well-known hysteresis behavior of this transition.

Upon heating, the phase transition from the monoclinic $VO_2$ (M) to the tetragonal form initiated at about 70° C. and was complete by 80° C. The transition was easily detected by the sudden shift in the $VO_2$ (M) (011) peak at ~27.8° 2θ to the $VO_2$ (T) (110) peak at ~27.6° 2θ. The transition was also captured at ~37.0° 2θ, where the superimposed (−211) and (200) peaks of the $VO_2$ (M) show a shift in 2θ between 70° C. and 80° C. as the $VO_2$ (T) (101) peak forms. However, in this case, the (101) $VO_2$ (T) peak was observed at a higher angle (~37.2° 2θ) than the lower temperature counterparts. The observation of a sudden change in peak location with temperature, coupled with the awareness that these peak shifts occur in opposing angular directions depending on (hkl) easily diagnoses this as structural phase transformation behavior (as opposed to thermal expansion or phase decomposition effects).

After the maximum temperature of 100° C. was reached, the sample was cooled back down, and the reverse transformation from $VO_2$ (T) to $VO_2$ (M) was observed. In the case of cooling, the transition is delayed until ~60° C. for the onset of the transition and looks to switch back to $VO_2$ (M) by ~50° C., although there may continue to be ongoing conversion even in the 50-40° C. range. Hence, we observe a ~10° C. hysteresis between heating and cooling for the monoclinic/tetragonal transition. This is consistent with other reports (e.g., Lu Z et al., *J. Mater. Chem.* 2011; 21:14776-82).

In conclusion, low temperature synthesis protocols for conversion of VOP powders to $VO_2$ (T) have been successfully determined via HTXRD. A straightforward heat treatment of VOP powder under ~50 ppm $O_2$ at 420° C. reveals initial formation of $VO_2$ (B), which subsequently converts to $VO_2$ (T) after ~30 minutes of hold time. Room temperature XRD analysis of the synthesized $VO_2$ (T) powder described transformation to the monoclinic $VO_2$ (M) form. Subsequent temperature cycling through the monoclinic to tetragonal transition revealed the onset of conversion to $VO_2$ (T) at ~70° C. Upon cooling, the tetragonal-monoclinic transformation was suppressed by ~10° C. to ~60° C., illustrating the hysteresis effect of the phase change.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A method of preparing crystalline vanadium oxide, the method comprising:
   (i) providing a vanadium oxide precursor comprising vanadium oxide particles;
   (ii) annealing the vanadium oxide particles at a first $O_2$ partial pressure of between 2 ppm and 500 ppm, thereby preparing the crystalline vanadium oxide in tetragonal form; and
   (iii) determining a first temperature $T_1$ at which a metastable $VO_2$ form and/or a tetragonal $VO_2$ form is present first formed at the first $O_2$ partial pressure.

2. The method of claim 1, further comprising (iv) adjusting the $O_2$ partial pressure to a second $O_2$ partial pressure of between 2 ppm and 500 ppm different from the first $O_2$ partial pressure, thereby further isolating the crystalline vanadium oxide in tetragonal form.

3. The method of claim 1, wherein the crystalline vanadium oxide is $VO_2$.

4. The method of claim 1, wherein the crystalline vanadium oxide has substantially the same morphology as the vanadium oxide particles.

5. The method of claim 4, wherein the vanadium oxide particles comprise vanadium pentoxide $V_2O_5$.

6. A method of preparing crystalline vanadium oxide, the method comprising:
   (i) providing a vanadium oxide precursor comprising vanadium oxide particles;
   (ii) annealing the vanadium oxide particles at a first $O_2$ partial pressure $P_1$, thereby forming one or more vanadium oxide form(s);
   (iii) obtaining one or more spectroscopy measurements of the vanadium oxide form(s);
   (iv) determining a first temperature $T_1$ at which a metastable $VO_2$ form and/or a tetragonal $VO_2$ form is present first formed; and
   (v) adjusting the $O_2$ partial pressure to a second $O_2$ partial pressure $P_2$ while maintaining $T_1$, thereby preparing the crystalline vanadium oxide.

7. The method of claim 6, wherein $P_2$ is less than $P_1$.

8. The method of claim 6, wherein the crystalline vanadium oxide is in tetragonal form.

9. The method of claim 6, further comprising (vi) adjusting the temperature to a second temperature $T_2$ while maintaining $P_2$, wherein step (v) and (vi) can be performed in any order.

10. The method of claim 9, wherein $T_2$ is greater than $T_1$.

\* \* \* \* \*